United States Patent [19]

Stevens

[11] Patent Number: 4,603,495
[45] Date of Patent: Aug. 5, 1986

[54] ALPHANUMERIC DISPLAY MODULES

[76] Inventor: John K. Stevens, 8 Alexander Street, Brampton, Ontario, Canada, L6V 1H6

[21] Appl. No.: 652,040

[22] Filed: Sep. 19, 1984

[51] Int. Cl.⁴ ............................................. G09F 3/04
[52] U.S. Cl. ........................................ 40/451; 40/446
[58] Field of Search .............. 40/451, 448, 447, 449, 40/450, 452; 340/762

[56] References Cited

U.S. PATENT DOCUMENTS

| 3,273,270 | 9/1966 | Skrobisch | 40/451 |
| 3,516,185 | 6/1970 | Paine | 40/448 |
| 3,570,158 | 3/1971 | Hackett | 40/452 |
| 3,803,589 | 4/1974 | Hatsukano et al. | 340/347 DD |
| 4,092,638 | 5/1978 | Ripley | 340/762 |
| 4,142,182 | 2/1979 | Kmetz | 340/765 |
| 4,231,034 | 10/1980 | Bechteler | 40/448 |
| 4,394,653 | 7/1983 | Breeze | 340/762 |

FOREIGN PATENT DOCUMENTS

| 31033 | 7/1981 | European Pat. Off. | 40/450 |
| 3223437 | 1/1983 | Fed. Rep. of Germany | 340/762 |
| 933854 | 8/1963 | United Kingdom . | |
| 1462307 | 1/1977 | United Kingdom | 40/450 |
| 2001468 | 1/1979 | United Kingdom | 40/448 |
| 2028547 | 3/1980 | United Kingdom . | |
| 2090036 | 6/1982 | United Kingdom . | |

Primary Examiner—Gene Mancene
Assistant Examiner—Cary E. Stone
Attorney, Agent, or Firm—Murray and Whisenhunt

[57] ABSTRACT

The invention provides an alphanumeric display module of four controllable cells, each constituted by electrically selectable elements that is able to provide significantly increased vocabulary of words considered essential for merchandising, such as "SAVE" and "BUY", displayed in an acceptable unambiguous manner, while requiring less than 40 electric control lines, so that currently available 40 terminal memory storage devices can be employed in a simple and economical control circuit. The first two cells are of conventional "figure 8" configuration, each employing seven controllable elements. The third cell includes an upward right inclined element in its lower half thus, for example, removing ambiguity between "U" and "V", while the fourth cell includes an additional vertical stroke of two separate elements between and parallel to the existing vertical strokes to permit, for example, acceptable display of "T" and "Y" and "W". A selectable decimal period is provided at least between the second and third cells, and another may be provided between the third and fourth cells. A fifth cell can be provided consisting of a percentage sign and a cents sign having an oblique stroke in common. All of the thirty five elements can be controlled using only thirty six control lines, so that four are still available for basic control purposes, i.e., ground, power input, clock input and display backplane. It is also possible to provide the second cell with a downward right inclined element in the upper half to permit display of an unambiguous "N" and consequent display of the word "NEW".

13 Claims, 1 Drawing Figure

U.S. Patent   Aug. 5, 1986   4,603,495
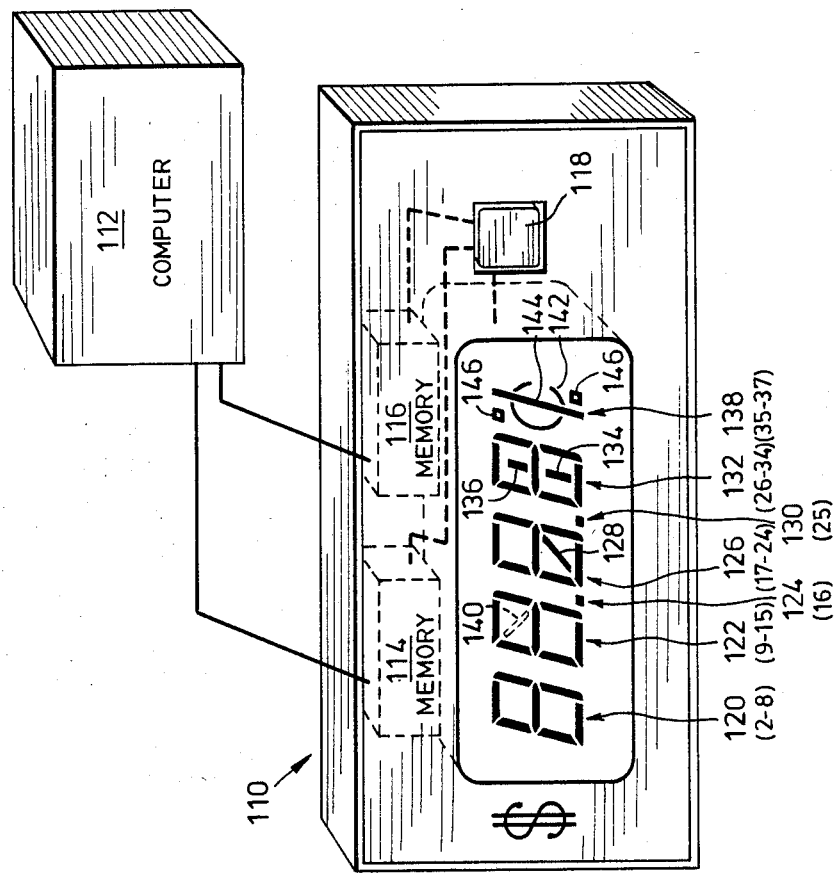

ALPHANUMERIC DISPLAY MODULES

FIELD OF THE INVENTION

This invention is concerned with improvements in or relating to alphanumeric display modules and especially, but not exclusively, to such modules intended for merchandising and price displays in stores such as food markets.

BACKGROUND OF THE INVENTION

Alphanumeric display modules of the type employing light emitting diodes (LED) or liquid crystals (LCD) are now used in a number of electronic devices requiring the visual display to an observer of information generated by the operator of the device. Examples only of such devices are simple calculators, cash-registers, weigh scales, clocks and radios. Such modules consist of a fixed number of so-called "cells", each of which cells includes a number of elements that are energized selectively for the cell to display the required information, usually one numerical or alphabetical integer. Cells intended solely for display of number information now almost universally are of "figure eight" configuration, coprising seven controllable elements which when all operative cause the cell to display the numeral 8; the other nine numbers in the decimal system can be displayed by selection of fewer elements. The cell requires eight control leads, one for each element to be controlled plus one common lead, to which appropriate control voltages are applied to activate the selected cell elements.

Such a cell has a highly restricted capacity for display of alphabetical information without substantial ambiguity, and is in practice limited to the thirteen letters "A", "B", "C", "E", "F", "H", "I", "J", "L", "O", "P", "S" and "U", plus the letter "D" if the possibility of ambiguity with the letter "O" is ignored, all in upper case. The lower case availability is even more limited, being restricted to the letters "b", "c", "d", "i", "l", "n", "o", "r" and "u". Modified forms of cell that are used if alphabetical information must be displayed employ four and five more elements respectively, so that 12 and 13 electrical control lines respectively are required. In one such modified form the four additional elements form two diagonals from corner to corner, while the other modified form employs the same four diagonal elements, and in addition the middle cross-bar is divided into two separate elements. Even these modified forms are not able to clearly resolve all of the possible ambiguities, such as those between "U" and "V" and between "D" and "O".

It is also becoming a requirement to be able to present on a single display module different pieces of information alternatively and/or in some sequence, and this necessitates storage of the non-displayed information in some inexpensive manner and its subsequent retrieval from storage and employment to control the display module. The volume cost of a commercially or custom produced integrated circuit (IC) is directly related to the size of the actual silicon chip and the number of connections made from the chip to other outside circuitry. An IC that measures 100 mil by 100 mil and requires 42 external connections will be unexpectedly more expensive than an IC that only requires 38 external connections. This fact is simply because there are direct costs associated with bonding small wires from the pads on the silicon chip to the external metal pin connectors. There are also available standard IC packages that only allow for a certain number of connections; a standard 48 pin package of this type costs considerably more than a 40 pin package, and a 64 pin package is priced higher than a 48 pin package. Thus, there are significant economic advantages to first minimizing the number of connections from an IC and second to keeping the total number of connections to a value permitting use of one of the standard size packages. One standard package has 40 possible connections. In a typical display controller for a liquid crystal display (LCD) with 40 external pins, one pin must always be used as a ground, one for input voltages (5 volts), one for signal input, one for clock input, and finally one for the backplane or what might be called the ground of the display. This leaves with this package a maximum of 35 pins for direct driving and control of the display segments. This size also limits to five the number of "figure eight" cells that could be employed with a 40 pin element, and limits to three the number of modified cells, without the complications and expense of employing a non-standard storage element or a number of separate standard storage elements for each module.

A particular example of the application of such a display unit is a merchandising module for a food market which can, for example, be placed on a shelf edge in front of the respective row or rows of goods and operated to give prospective purchasers information selectively and/or in sequence as to total price per item, unit price per item, the percentage reduction of a sale price, etc. It is also desired to be able to operate the module to give different merchandising messages involving alphabetical information. Such a module and its associated control circuitry must be relatively inexpensive to be acceptable commercially in the highly cost conscious environment of food marketing, and at this time this requires that the entire module be fully operative with not more than forty control lines, so as to be operable with existing forty terminal memory storage devices. It is possible to provide all of the numerical information required with four "figure eight" cells, requiring 32 control lines. However, the module must also be able to display at least one decimal period, and alternatively the cents symbol "¢" and the percentage symbol "%" which, since they have the oblique stroke in common, can be operated from only three more lines, for a total of 36 lines. This leaves only four control lines available to input any additional information that may be required and provide power voltages and ground.

DEFINITION OF THE INVENTION

It is therefore one specific object of the invention to provide a new four cell alphamumeric display module able to display both number and increased alphabetical information as compared with "figure eight" cells and able to use not more than 40 control lines for control thereof.

In accordance with the present invention there is provided an alphanumeric display module comprising at least four display cells which from left to right as viewed by an observer are:

(a) first and second cells which are figure eight cells having seven selectable elements, each cell having two spaced vertical sides each of two elements disposed one above the other, having horizontal top and bottom sides each of one element, and having a horizontal cross-bar of one element disposed between the top and bottom elements;

(b) a third cell which is a figure eight cell having in addition a right upwardly inclined diagonal selectable element from the bottom left corner of the cell to the upper right corner at the junction of the cross-bar element and the lower right vertical element;

(c) a fourth cell which is a figure eight cell having in addition two additional equal vertical selectable elements extending from top to bottom of the cell one above the other parallel to the vertical side elements and at least approximately midway between the vertical side elements; and (d) respective electric control leads connected to the cell elements for selective energization thereof.

Preferably the module includes a first period element, disposed between the second and third cells, and may also include a second period element disposed between the third and fourth cells, respective electric control leads being connected to the period elements for selective energization thereof.

Preferably the module includes a fifth cell to the right of the fourth cell, as viewed by an observer, the fifth cell comprising an upward right inclined oblique stroke element, a pair of simultaneously controlled period elements which together with the oblique element constitute a percentage sign, and a C-shaped element straddling the oblique element and constituting therewith a cents sign, and respective electric control leads connected to the oblique element, the pair of period elements and the C-shaped element for selective energization thereof.

The said second cell may have in addition a right downwardly inclined diagonal selectable element from the top left corner of the cell to the bottom right corner at the junction of the cross-bar element and the upper right vertical element, together with respective electric control leads connected to the element for selective energisation thereof.

DESCRIPTION OF THE DRAWINGS

A particular preferred embodiment of the invention will now be described, by way of example, with reference to the accompanying diagrammatic drawing which is a perspective view of a merchandising module employing the invention in the alphanumeric display cells thereof.

DESCRIPTION OF THE PREFERRED EMBODIMENT

The embodiment illustrated comprises a merchandising module 110 which is a display unit for use in a food store mounted on the edge of a shelf, or above, in association with one or more rows of goods and is operable to give prospective purchasers information as to the total cost of each associated item, as well as the unit price per item. The module is also able to display alphabetical information, as will be described below. The information to be displayed by each module can be derived, for example, from a central computer 112 which supplies the information to a 40-lead memory unit 114 from which the individual elements of the display cells are controlled. With this particular embodiment unit price information is supplied from the computer 112 to a second 40-lead memory unit 116 which is accessed instead of the unit 114 upon the customer depressing a push button 118. Other alphabetic merchandising information is supplied to the module by the computer in a predetermined sequence and at predetermined time intervals. The usual power leads, etc. required by the computer and the memory units are not illustrated and will be well-known to those skilled in this particular art.

The module has a $ sign permanently printed at the extreme left, since such a sign will be ignored by the viewer when alphabetic information is displayed. The controllable portion then consists of five controllable cells, from left to right as seen in the FIGURE as follows:

(a) a first "figure eight" cell 120 consisting of seven controllable LCD elements the cell having two spaced vertical sides each of two elements disposed one above the other, having horizontal top and bottom sides each of one element, and having a horizontal cross-bar of one element disposed between the top and bottom elements. Thus, seven control leads are required; one lead being the common return lead or base electrode for all of the elements of the entire unit;

(b) a second "figure eight" cell 122 also consisting of seven controllable LCD elements; since this cell uses the same common control lead as the first cell it requires additional seven control leads;

(c) a period 124 between the second and third cells requiring a further sixteenth control lead;

(d) a third "figure eight" cell 126 having an additional controllable element in accordance with the invention, this additional element being a right upwardly inclined diagonal 128 which extends from the bottom left corner of the cell to the upper right corner which is at the junction of the cross bar element and the lower right "vertical" element; the cell therefore requires eight a further control leads bringing the total to 24 leads;

(e) a second period 130 between the third and fourth cells requiring a 25th control lead;

(f) the fourth "figure eight" cell 132 having two additional controllable elements 134, 136 in accordance with the invention, these two additional elements being vertical elements of the same length as the other vertical side elements, so that they extend the full length of the cell, and being disposed parallel to the existing vertical side elements; the fourth cell therefore requires nine control leads bringing the total to 34 leads 26 through 34 inclusive;

(g) a fifth cell 138 consisting of a combined ¢ symbol to indicate when a price is in cents, the symbol being constituted by the letter C, reference 142, straddling an upward right inclined oblique stroke element 144, and a percentage symbol % to indicate when the preceding figure is a percentage, the latter being constituted by the oblique stroke 144 with a pair of appropriately located, simultaneously energized periods 146; the two symbols having the oblique stroke in common so that only three further control leads are required.

It will be seen that there are still available three further control leads bringing the total to 40 leads for power and inputs in the merchandising module. It is found with a module of the invention that the vocabulary of words that can be displayed is increased, particularly in respect of words that are very significant in merchandising. For example, the third cell is now able to display unambiguously the letter "V" as against the letter "U", permitting the acceptable display of the words "SAVE" and "LOVE". The fourth cell is now able to display acceptably the letters "T" and "Y" and "W" permitting the display, among others, of the words "IT", "OUT", "CUT", "BY", "BUY", "JOY", "LOW" and "SHOW", all of which are desirable for effective price merchandising. The invention therefore permits the production of a relatively low cost electronic module able to display most of the significant alphanumeric information required, while employing a minimum of control lines for this purpose.

In another embodiment the second cell 122 is provided with an additional controllable element 140 which is a right downwardly inclined diagonal element extending from the top left corner of the cell to the junction of the cross-bar element and the upper vertical element of the cell right side. This additional element permits the cell to display an unambiguous "N" permitting the display, for example, of "NOW" and "NOT".

The number of control lines needed can of course be decreased even further by multiplexing, for example, in the ratio of 2:1 or even 3:1. The number of control electrodes is thereby reduced by the multiplexing ratio, while one or two respective additional backplane electrodes must be provided. Multiplexing is able to reduce the overall cost, but has a disadvantage in that the viewing angles and contrasts of the operative elements are reduced. The display of the invention will still offer a substantial saving with acceptable readability as compared to the known sixteen element cell displays, whether multiplexed or not.

I claim:

1. An alphanumeric display module comprising at least four display cells which from left to right as viewed by an observer are:
    (a) first and second cells which are figure eight cells having seven selectable elements, each cell having two spaced vertical sides each of two elements disposed one above the other, having horizontal top and bottom sides each of one element, and having a horizontal cross-bar of one element disposed between the top and bottom elements;
    (b) a third cell which is a figure eight cell having in addition a right upwardly inclined diagonal selectable element from the bottom left corner of the cell to the upper right corner at the junction of the cross-bar element and the lower right vertical element;
    (c) a fourth cell which is a figure eight cell having in addition two additional equal vertical selectable elements extending from top to bottom of the cell one above the other parallel to the vertical side elements and at least approximately midway between the vertical side elements; and
    (d) respective electric control leads connected to the cell elements for selective energization thereof;
    the display module including in addition a fifth cell to the right of the fourth cell, as viewed by an observer, the fifth cell comprising an upward right inclined oblique stroke element, a pair of simultaneously controllable period elements which together with the oblique element constitute a percentage sign, and a C-shaped element straddling the oblique element and constituting therewith a cents sign, and respective electric control leads connected to the oblique element, the pair of period elements and the C-shaped element for selective energization thereof.

2. A display module as claimed in claim 1, and including in addition a first period element disposed between the second and third elements, and respective electric control leads connected to the period elements for selective energization thereof.

3. A display module as claimed in claim 2, and including in addition a second period element disposed between the third and fourth elements, and respective electric control leads connected to the period elements for selective energization thereof.

4. An alphanumeric display module comprising at least four display cells which from left to right as viewed by an observer are:
    (a) first and second cells which are figure eight cells having seven selectable elements, each cell having two spaced vertical sides each of two elements disposed one above the other, having horizontal top and bottom sides each of one element, and having a horizontal cross-bar of one element disposed between the top and bottom elements;
    (b) a third cell which is a figure eight cell having in addition a right upwardly inclined diagonal selectable element from the bottom left corner of the cell to the upper right corner at the junction of the cross-bar element and the lower right vertical element;
    (c) a fourth cell which is a figure eight cell having in addition two additional equal vertical selectable elements extending from top to bottom of the cell one above the other parallel to the vertical side elements and at least approximately midway between the vertical side elements; and
    (d) respective electric control leads connected to the cell elements for selective energization thereof;
    and including in addition a fifth cell to the right of the fourth cell, as viewed by an observer, the fifth cell comprising an upward right inclined oblique stroke element, a pair of simultaneously controllable period elements which together with the oblique element constitute a percentage sign, and a C-shaped element straddling the oblique element and constituting therewith a cents sign, and respective electric control leads connected to the oblique element, the pair of period elements and the C-shaped element for selective energization thereof;
    wherein the said second cell has in addition a right downwardly inclined diagonal selectable element from the top left corner of the cell to the bottom right corner at the junction of the cross-bar element and the upper right vertical element, together with respective electric control leads connected to the element for selective energization thereof.

5. A display module as claimed in claim 4, and including in addition a first period element disposed between the second and third elements, and respective electric control leads connected to the period elements for selective energization thereof.

6. A display module as claimed in claim 5, and including in addition a second period element disposed between the third and fourth elements, and respective electric control leads connected to the period elements for selective energization thereof.

7. An alphanumeric display module for displaying both an item price and the corresponding unit price comprising at least four display cells which from left to right as viewed by an observer are:
    (a) first and second cells which are figure eight cells having seven selectable elements, each cell having two spaced vertical sides each of two elements disposed one above the other, having horizontal top and bottom sides each of one element, and having a horizontal cross-bar of one element disposed between the top and bottom elements;

(b) a third cell which is a figure eight cell having in addition a right upwardly inclined diagonal selectable element from the bottom left corner of the cell to the upper right corner at the junction of the cross-bar element and the lower right vertical element;

(c) a fourth cell which is a figure eight cell having in addition two additional equal vertical selectable elements extending from top to bottom of the cell one above the other parallel to the vertical side elements and at least approximately midway between the vertical side elements; and (d) respective electric control leads connected to the cell elements for selective energization thereof; said display module including means for controlling the display of a unit price by the module, said means being responsive to manual actuation to display a unit price in said display cells instead of said item price.

8. A display module as claimed in claim 7 wherein said means for controlling the display of the unit price is a depressable button located on the display module adjacent the display cells.

9. A method of displaying unit price information by alphanumeric characters on an alphanumeric display module normally displaying an item price, said method comprising the steps of:

storing data representative of the unit price in memory means;

manually actuating switch means located on a surface of the display module; and transferring said unit price data in response to said manual actuation to said display module to display said unit price information in said alphanumeric characters instead of said item price.

10. An alphanumeric display module for displaying both an item price and the corresponding unit price comprising at least four liquid crystal display cells which from left to right as viewed by an observer are:

(a) first and second cells which are figure eight cells having seven selectable elements, each cell having two spaced vertical sides each of two elements disposed one above the other, having horizontal top and bottom sides each of one element, and having a horizontal cross-bar of one element disposed between the top and bottom elements;

(b) a third cell which is a figure eight cell having in addition a right upwardly inclined diagonal selectable element from the bottom left corner of the cell to the upper right corner at the junction of the cross-bar element and the lower right vertical element;

(c) a fourth cell which is a figure eight cell having in addition two additional equal vertical selectable elements extending from top to bottom of the cell one above the other parallel to the vertical side elements and at least approximately midway between the vertical side elements; and (d) respective electric control leads connected to the cell elements for selective energization thereof; the total number of electric control leads being provided by a single forty pin integrated circuit; said display module including means for controlling the display of a unit price, said means being responsive to manual actuation to display a unit price in said display cells instead of said item price.

11. A display module as claimed in claim 10 wherein said means for controlling the display of the unit price is a depressable button located on the display module adjacent the display cells.

12. An alphanumeric display module comprising five liquid crystal display cells for displaying an item price, which from left to right as viewed by an observer are:

(a) first and second cells which are figure eight cells having seven selectable elements, each cell having two spaced vertical sides each of two elements disposed one above the other, having horizontal top and bottom sides each of one element, and having a horizontal cross-bar of one element disposed between the top and bottom elements;

(b) a third cell which is a figure eight cell having in addition a right upwardly inclined diagonal selectable element from the bottom left corner of the cell to the upper right corner at the junction of the cross-bar element and the lower right vertical element;

(c) a fourth cell which is a figure eight cell having in addition two additional equal vertical selectable elements extending from top to bottom of the cell one above the other parallel to the vertical side elements and at least approximately midway between the vertical side elements;

(d) a fifth cell to the right of the fourth cell, as viewed by an observer, the fifth cell comprising an upward right inclined oblique stroke element, a pair of simultaneously controllabel period elements which together with the oblique element constitute a percentage sign, and a C-shaped element straddling the oblique element and constituting therewith a cents sign, and respective electric control leads connected to the oblique element, the pair of period elements and the C-shaped element for selective energization thereof; and a first period element disposed between the second and third elements and a second period element disposed between the third and fourth elements;

the cells and the period elements having respective electric leads connected to each element thereof for selective energization thereof, the total number of said electric control leads being provided by a single forty-pin integrated circuit, said display module including a button on the display module adjacent said display cells, said button being responsive to manual actuation to cause said display cells to display a unit price instead of said item price.

13. An alphanumeric display module comprising five liquid crystal display cells for displaying an item price, which from left to right as viewed by an observer are:

(a) first and second cells which are figure eight cells having seven selectable elements, each cell having two spaced vertical sides each of two elements disposed one above the other, having horizontal top and bottom sides each of one element, and having a horizontal cross-bar of one element disposed between the top and bottom elements, said second cell has in addition a right downwardly inclined diagonal selectable element from the top left corner of the cell to the bottom right corner at the junction of the cross-bar element and the upper right vertical element, together with respective electric control leads connected to the element for selective energisation thereof;

(b) a third cell which is a figure eight cell having in addition a right upwardly inclined diagonal selectable element from the bottom left corner of the cell to the upper right corner at the junction of the cross-bar element and the lower right vertical element;

(c) a fourth cell which is a figure eight cell having in addition two additional equal vertical selectable elements extending from top to bottom of the cell one above the other parallel to the vertical side elements and at least approximately midway between the vertical side elements;

(d) a fifth cell to the right of the fourth cell, as viewed by an observer, the fifth cell comprising an upward right inclined oblique stroke element, a pair of simultaneously controllabel period elements which together with the oblique element constitute a percentage sign, and a C-shaped element straddling the oblique element and constituting therewith a cents sign, and respective electric control leads connected to the oblique element, the pair of period elements and the C-shaped element for selective energization thereof; and a first period element disposed between the second and third elements and a second period element disposed between the third and fourth elements;

the cells and the period elements having respective electric leads connected to each element thereof for selective energization thereof, the total number of said electric control leads being provided by a single forty-pin integrated circuit, said display module including a button on the display module adjacent said display cells, said button being responsive to manual actuation to cause said display cells to display a unit price instead of said item price.

\* \* \* \* \*